Aug. 30, 1932.  E. KERN  1,873,964
RECTIFIER ISOLATING APPARATUS
Filed Nov. 10, 1926
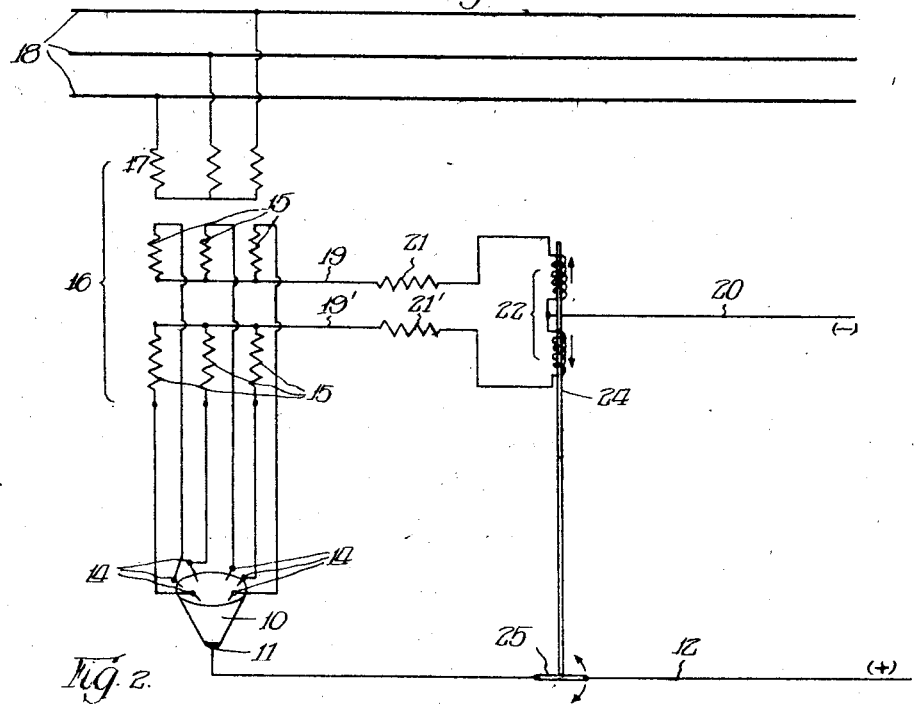
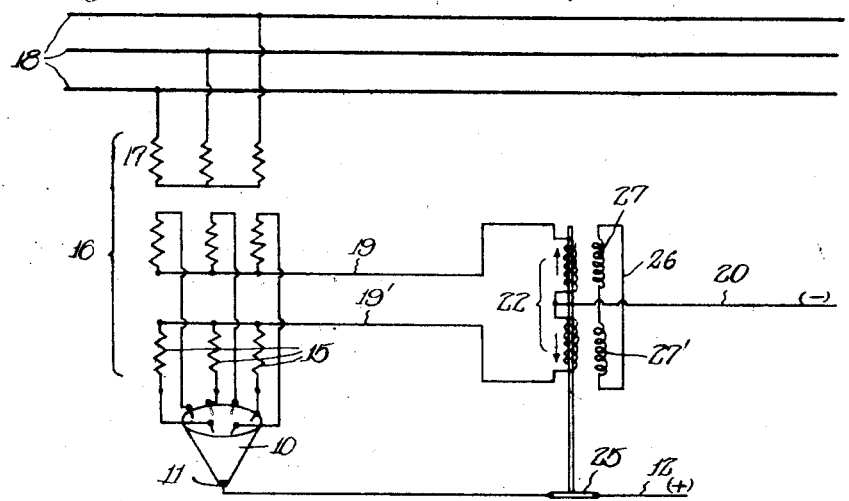
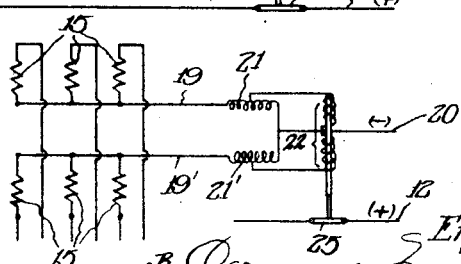
Inventor:
Erwin Kern, Patented Aug. 30, 1932

1,873,964

UNITED STATES PATENT OFFICE

ERWIN KERN, OF WETTINGEN, NEAR BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

RECTIFIER ISOLATING APPARATUS

Application filed November 10, 1926, Serial No. 147,479, and in Germany November 27, 1925.

This invention relates to protective apparatus for mercury vapor rectifier installations.

The general object of the invention is the provision of a simple apparatus whereby a single rectifier may be cut out automatically upon the occurrence of an abnormal condition therein, such as a short-circuit or back-fire, without involving the cutting out or cessation of operation of associated portions of the installation, for example, other rectifiers which supply the D. C. network.

A more specific object is the provision of an automatic operating arrangement for the protection of a rectifier and its associated apparatus which is brought into operation, in the event of the contingencies mentioned, by the unbalanced condition in the rectifier resulting therefrom, without the use of relays or other complicating appurtenances.

Other and further objects will be pointed out or indicated hereinafter or will be apparent to one skilled in the art upon an understanding of the invention or its employment in practice.

For purposes of exemplification, I illustrate and describe herein certain arrangements and apparatus wherein the invention may be embodied and practiced, but it is to be understood that other structural forms and arrangements may be devised without departing from the spirit of the invention or its scope indicated in the appended claims.

In the drawing forming a part of this specification,

Fig. 1 is a diagrammatic illustration of a single six anode mercury vapor power rectifier supplied from a three phase source, together with one arrangement of automatic isolating apparatus;

Fig. 2 is a similar diagram showing a modified arrangement for eliminating the effects of harmonic currents; and Fig. 3 is a diagram illustrating a third arrangement of protective gear for a similar rectifier installation, the rectifier and its supply lines being omitted, however.

The present invention is in certain respects an improvement and modification of that covered by my Patent No. 1,722,097 issued July 23, 1929 on an application, filed November 3, 1925, and like that, is designed to provide for the automatic cutting out of a single faulty rectifier, which may be associated in parallel with other rectifiers or other apparatus, without involving the disablement of the entire group or system. The present improvement is in the direction of simplification, the tripping mechanism being arranged for operation directly by a current differential resulting from a disturbance of the balance normally maintained in the rectifier between the current flow of symmetrically connected electrodes. It may be advantageously applied in rectifier installations in which the rectifier is supplied by a simple polyphase transformer, as distinguished from transformers in which the current is distributed to the rectifier by a combination of portions of different basal phases. The nature of the invention will be ascertained from the examples illustrated. In that shown in Fig. 1, the rectifier 10 has its cathode 11 connected to the positive line 12 of the D. C. network, and has its six anodes 14 supplied severally from respective phase windings 15 of the secondary of the transformer 16, the three-phase primary 17 of which is supplied from the three-phase mains 18. The secondary windings 15 are star-connected in two groups in such relationship that under normal working of the rectifier the current flow from one group is at all times symmetrical to the current flow from the other group. The neutral points 19 and 19' of the two groups are connected to the negative line 20 of the D. C. system in balanced relationship through the coupled absorption coils 21 and 21' and the respective halves of the solenoid coil 22. The solenoid core 24 is the actuated element of the trip gear, which includes the cut-out switch 25, the opening of which disconnects the rectifier from the D. C. line 12. The halves of the solenoid coil 22 are equal in their effectiveness on the core 24 and are effective in opposite directions, so that under normal symmetrical flow of current in the balanced groups of windings 15, their effects on the core 24 will counterbalance and the core remain in equilibrium with the switch 25 closed. In the event the balance of current flow as between the groups of windings 15 is destroyed, as from a short-circuit or backfire within the rectifier 10, the current flow in one of the halves of solenoid coil 22 will preponderate over that in the other, with the result of shifting the core 24 to open the switch 25. The tripping gear is thus directly responsive to a dissymmetry of current flow within the rectifier as between the symmetrically connected groups of anodes. Inasmuch as a third harmonic voltage is present across the star points 19 and 19', provision must be made for rendering it ineffective upon the solenoid coil 22. The provision of the coupled mutually-compensating coils 21 and 21' exercises a choking effect which will prevent the flow of a harmonic current sufficient to affect the stability of the solenoid.

In the arrangement illustrated in Fig. 2 the rectifier, its transformer, and the trip gear are as above described, with the exception that the absorption or choking coil is eliminated, and for the purpose of compensating the effects of the current harmonics upon the solenoid coil, a closed circuit 26 is provided containing the compensating coil portions 27 and 27' which are closely and inductively coupled with the respective halves of the solenoid coil 22, so that the A. C. ampere turns in the latter will be neutralized by the ampere turns produced by the alternating currents induced in the compensating coils 27 and 27' and flowing in the closed circuit 26. The effect and action of the solenoid coil incident to normal operation of the rectifier and to an abnormal condition resulting in a dissymmetry of current flow therein, are the same as in the instance illustrated in Fig. 1.

In the arrangement illustrated in Fig. 3, it will be understood that the transformer secondary windings 15 are connected to the rectifier anodes, and the D. C. line 12 to the cathode, as in the other illustrated embodiments of my invention, and the neutral points 19 and 19' of the transformer secondary groups are connected to the negative line 20 through the absorption coil 21—21'. The solenoid coil 22 is connected between balanced points on the absorption coil 21—21' and the negative line 20, the magneto-motive forces of the halves of the coil 22 counterbalancing under the conditions of normal operation of the rectifier, and operating to open the switch 25 when the symmetry of current flow within the rectifier is destroyed.

What I claim is:

1. Apparatus of the class described comprising, in combination, a supply line, a rectifier for supplying said line and having anode circuits arranged for symmetrical current flow, a cut-out switch for disconnecting the rectifier from the line, and switch-controlling solenoid coils developing mutually counterbalancing magneto-motive forces under excitation of the symmetrical currents in the anode circuits.

2. Apparatus of the class described comprising, in combination, a rectifier having supply circuits connected in groups for symmetrical current flow, a disconnecting switch for the rectifier, equally and oppositely effective electro-magnet coils for controlling the switch, the respective coils being energized by current flow of respective supply-circuit groups.

3. Apparatus of the class described comprising, in combination, a direct current load circuit, a rectifier having symmetrically excited circuits forming sections of and supplying said load circuit, and protective gear including electro-magnetic means having counter-acting portions energized respectively by said symmetrically excited circuits.

4. In apparatus of the class described, in combination, a rectifier and its D. C. line, a polyphase transformer having symmetrical phase connection therewith, and protective gear including counterbalancing coils connected between symmetrical phases and the D. C. line.

5. In apparatus of the class described, in combination, a rectifier, a polyphase transformer having its phases associated in groups productive of symmetrical current flow to the rectifier, electro-magnet coils in series with respective phase groups, and differential protective gear operable by said electro-magnet coils.

6. In apparatus of the class described, in combination, a rectifier, a polyphase transformer having its secondary phases connected in the rectifier circuit in groups having symmetrical current distribution, an electro-magnet coil in the rectifier circuit in series with the transformer secondary, protective gear operable by the electro-magnet coil, and means protecting the electro-magnet coil from harmonic current influences.

7. In apparatus of the class described, in combination, a rectifier, a polyphase supply transformer therefor having its phases distributed in two groups with symmetrical current characteristics, an electro-magnet winding having a portion in series with each group, protective gear operable by the electro-magnet winding, and means operable to neutralize flow of harmonic currents between the phase groups.

In testimony whereof I have hereunto subscribed my name this 22 day of October A. D. 1926 at Zurich, Switzerland.

ERWIN KERN.